United States Patent [19]

Yuan et al.

[11] Patent Number: 5,636,044
[45] Date of Patent: Jun. 3, 1997

[54] SEGMENTED POLYMER STABILIZED AND POLYMER FREE CHOLESTERIC TEXTURE LIQUID CRYSTAL DISPLAYS AND DRIVING METHOD FOR SAME

[75] Inventors: Haiji Yuan, Stow; George Ventouris, Parma Heights, both of Ohio

[73] Assignee: Kent Displays, Inc., Kent, Ohio

[21] Appl. No.: 321,848

[22] Filed: Oct. 14, 1994

[51] Int. Cl.⁶ .................................................. G02F 1/1343
[52] U.S. Cl. ........................................... 349/142; 349/139
[58] Field of Search .................................... 359/89, 88, 87

[56] References Cited

U.S. PATENT DOCUMENTS

| | | | |
|---|---|---|---|
| 3,731,986 | 5/1973 | Fergason | 359/89 |
| 3,902,790 | 9/1975 | Hsieh et al. | 359/89 |
| 3,976,362 | 8/1976 | Kawakami | 350/160 |
| 4,181,563 | 1/1980 | Miyaka et al. | 359/89 |
| 4,202,606 | 5/1980 | Wild | 359/89 |
| 4,202,607 | 5/1980 | Washizuka et al. | 359/89 |
| 4,270,846 | 6/1981 | Miyamoto | 359/89 |
| 4,423,929 | 1/1984 | Gomi | 359/89 |
| 4,533,213 | 8/1985 | Washizuka et al. | 359/89 |
| 4,815,824 | 3/1989 | Sharples | 359/89 |
| 5,251,048 | 10/1993 | Doane et al. | 359/51 |
| 5,252,954 | 10/1993 | Nagata et al. | 345/95 |

FOREIGN PATENT DOCUMENTS

| | | | |
|---|---|---|---|
| 55-89817 | 7/1980 | Japan | 359/89 |
| 56-80020 | 7/1981 | Japan | 359/89 |
| 2079507 | 1/1982 | United Kingdom | 359/89 |

*Primary Examiner*—William L. Sikes
*Assistant Examiner*—Tiep H. Nguyen
*Attorney, Agent, or Firm*—Harness, Dickey & Pierce, P.L.C.

[57] ABSTRACT

A display device (110) having first and second substrates (112) and (190) and a layer of a liquid crystal material having a periodic modulated structure, such as a PSCT or PFCT liquid crystal material disposed therebetween. The first substrate is divided into segment and non-segmented areas which are defined by a gap in the electrode materials disposed on the substrate. Similarly, the second substrate (190) is divided into common electrodes corresponding to the segmented and non-segmented areas on the first substrate.

26 Claims, 2 Drawing Sheets

SEGMENTED POLYMER STABILIZED AND POLYMER FREE CHOLESTERIC TEXTURE LIQUID CRYSTAL DISPLAYS AND DRIVING METHOD FOR SAME

Technical Field

This invention relates in general to segmented liquid crystal displays, and in particular to segmented polymer stabilized and polymer free cholesteric texture liquid crystal displays.

BACKGROUND

Recent concerted efforts in the field of liquid crystal materials have yielded a new class of reflective, cholesteric texture materials and devices. These liquid crystal materials have a periodic modulated optical structure that reflects light. These materials, known as polymer stabilized cholesteric texture (PSCT) and polymer free cholesteric texture (PFCT) are fully described in, for example, U.S. Pat. No. 5,251,048 and patent application Ser. Nos. 07/694,840 and 07/969,093, the disclosures of which are incorporated herein by reference.

Reflective cholesteric texture liquid crystal displays (both PSCT and PFCT) have two stable states at a zero applied field. One such state is the planar texture state which reflects light at a preselected wavelength determined by the pitch of the cholesteric liquid crystal material itself. The other state is the focal conic texture state which is substantially optically transparent. By stable, it is meant that once set to one state or the other, the material will remain in that state, without the further application of a field, as is the case in conventional displays. Conversely, in other types of conventional displays, each liquid crystal picture element must be addressed many times each second in order to maintain the information stored thereon. Accordingly, PSCT and PFCT materials are highly desirable for low energy consumption applications, since once set they remain so set.

Applications for PSCT and PFCT materials have focused on reflective displays. Typically such reflective displays have had the back plate thereof painted black to absorb any non-reflected light. As a result, the displays show the contrast of green, yellow, or such other color determined by the pitch of the cholesteric texture material, on black. In fact, black has heretofore been preferred since it can provide for high contrast ratios.

Conventional methods for addressing or driving such displays can be understood from a perusal of FIG. 1. FIG. 1 illustrates a graph showing the state of the liquid crystal material after the application of various driving voltages thereto. The liquid crystal material begins in a first state, either the reflecting state or the non-reflecting state, and is driven with an AC voltage, having an rms amplitude above $V_4$ in FIG. 1. When the voltage is removed quickly, the liquid crystal material switches to the reflecting state and will remain reflecting. If driven with an AC voltage between $V_2$ and $V_3$ the material will switch into the nonreflecting state and remains so until the application of a second driving voltage. If no voltage is applied, or the voltage is well below $V_1$, then the material will not change state, regardless of the initial state. In the context of a conventional segmented display, the background is always at a zero voltage. The segments are addressed with either low or high voltages to drive the segments to either black (non-reflecting) or color (reflecting).

The conventional method of driving PSCT and PFCT displays is described in an article entitled "Front-Lit Flat Panel Display from Polymer Stabilized Cholesteric Textures", by Doane, et al. and published in Conference Record, page 73, Japan Display '92, Society of Information Displays, October 1992 (the "Doane Article"). The Doane Article teaches addressing a row in a display by applying an AC waveform with an rms amplitude $V_{rs}$ between $V_2$ and $V_3$. A column voltage of zero is applied to the columns of all the pixels in the rows which are to be in the non-reflecting state. An AC voltage with rms amplitude greater than or equal to $V_4-V_{rs}$, but less than $V_1$ is applied to the columns of all pixels which are to be in the reflecting state.

The column voltages are out of phase with respect to the row voltages so that the effective voltage across the selected pixels is greater than or equal to $V_4$. The amplitude of the column voltage is always less than $V_1$, thus as the addressing of the display progresses from row-to-row, the column voltage does not alter the state of the pixels in rows which have already been addressed. Specifically, for a given single pixel, at time when no voltage is applied to the row address line of the display for the pixel, and a column voltage of $V_c$ (either + or −). The result is no change in the pixel since the pixel's row was not selected. During time when no voltage is applied to either the row or column lines for the pixel, and again the pixel is unchanged.

An improved driving scheme is described in U.S. patent application Ser. No. 08/288,831, filed Aug. 11, 1994, and entitled DRIVING METHOD FOR POLYMER STABILIZED AND POLYMER FREE LIQUID CRYSTAL DISPLAYS, by Catchpole, et al. The improved driving scheme allows for faster addressing of cholesteric liquid crystal displays, while reducing optical artifacts, and residual effects.

Referring now to FIG. 2, there is illustrated therein a partial cross-sectional side view of a PSCT or PFCT display device. The display 1 includes a first display substrate 2 fabricated of an insulating material such as glass, plastic or some other polymeric material. The substrate 2 has first and second major surfaces 3 and 4. On the first major surface 3 of substrate 2 is disposed a layer of an electrically conductive material 5. The electrically conductive layer 5 should be a transparent material. Accordingly, the electrode layer 5 may be a thin layer of metal such a silver, copper, titanium, molybdenum, and combinations thereof, so long as the metals are very thin, and non-reflective. Alternatively, the layer 5 maybe a thin layer of a transparent conductive material such as indium tin oxide. The layer may be fabricated as a plurality of elongated strips on the surface of the substrate 2.

Disposed opposite the first substrate 2 is a second substrate 6 fabricated of a high quality, transparent material such a glass or plastic. Disposed on one surface is an electrode 7, fabricated of a transparent conductive material, such as those described hereinabove with respect to layer 5.

The substrates 2 and 6 are arranged in opposed, facing relationship so that said layers of conductive material are parallel and facing one another. Disposed between said layers of conductive material is a layer of PSCT or PFCT liquid crystal material 8. The liquid crystal material has a periodic modulated optical structure that reflects light. The liquid crystal material comprises a nematic liquid crystal having positive dielectric anisotropy and chiral dopants. The material may further include a polymer gel or dye material. Thus, an electrical field may be applied to a layer of PSCT or PFCT liquid crystal material disposed therebetween. Once such a field is removed, the material is set to one of two said stable states, where it will remain until a new field is applied Notwithstanding the advantages provided by the bistable nature of PSCT and PFCT displays, they have not heretofore been useful in the field of segmented displays. FIGS. 3 and 4 are respectively, representations of the segmented and common electrode substrates of a segmented display device of the prior art. In FIGS. 3 and 4, areas which appear dark, such as segments 12, 14, and 16, lead lines 18, 20, and 22, and contacts 24, 26, and 28 of FIG. 3, and electrodes 30, 32, and 34, are all regions coated with a thin layer of a transparent conductive material such as indium tin oxide (ITO). Essentially, electrodes in the shape of the desired image are patterned onto a substrate.

Unfortunately, due to the nature of PSCT and PFCT materials, the conventional design will not work since the lead lines 18, 20, 22 and the areas without ITO will appear different than the other ITO coated areas. Attempts have been made to overcome this by masking the entire display (except the active segments) with various materials, such as black epoxy. This has yielded unacceptable results for some applications since it causes parallax at larger viewing angles. Further, once a mask color is chosen to match one of the states of the material, for example black, the display mode cannot be changed. For example a display which is assembled for yellow on black cannot be used as a black on yellow display.

Thus, there exists a need for a segmented, color PSCT and PFCT liquid crystal displays. In providing such a display, it should not have a great deal of parallax, yet should be able to provide for multiple color modes of operation. The device should also have a simplified driving scheme to easily and efficiently address and re-address the segmented display.

SUMMARY OF THE INVENTION

Briefly, according to the invention, there is provided a segmented PSCT or PFCT liquid crystal display. The instant invention provides an electrode design pattern in which the segment leads of the "segmented" substrate are substantially enlarged, leaving only a narrow insulating gap between the electrodes. The substrate having the common electrodes divided into only two electrode regions: one corresponding to the segments; and one corresponding to the background. The two electrodes on the common electrode substrate are separated by only a thin insulating area.

Further according to the invention, there is provided a method for driving a segmented PSCT or PFCT liquid crystal display in accordance with the instant invention. The driving scheme with the electrode pattern disclosed herein enables the entire viewing area to be switchable, except for the narrow gaps between active and background areas.

These and other advantages of the instant invention will become apparent from a perusal of the following drawings, detailed description, and claims.

DETAILED DESCRIPTION OF THE EMBODIMENT

Figure 1:
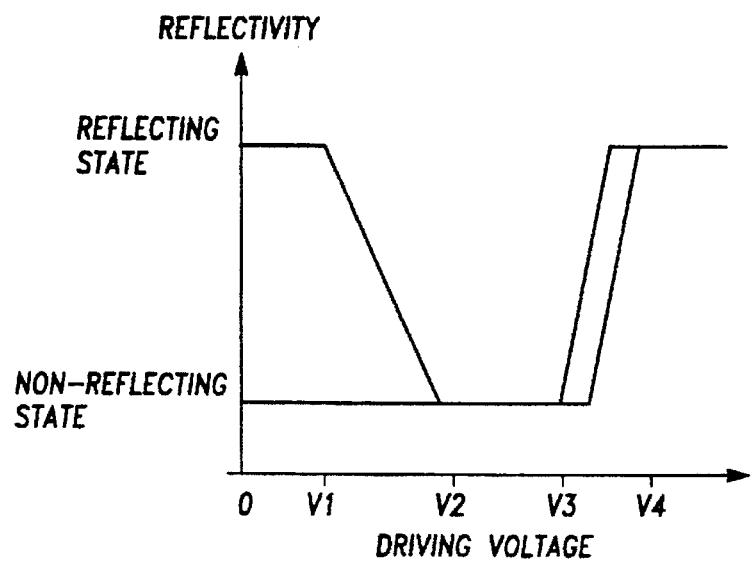
FIG. 1 is a graph illustrating electro-optical responses for PSCT and PFCT LCDs.
Figure 2:
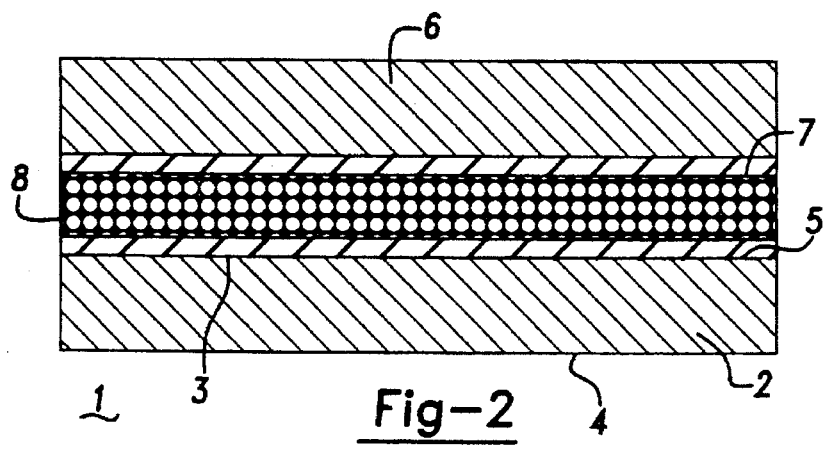
FIG. 2 is a partial cross-sectional side view of a PSCT or PFCT display device.
Figure 3:
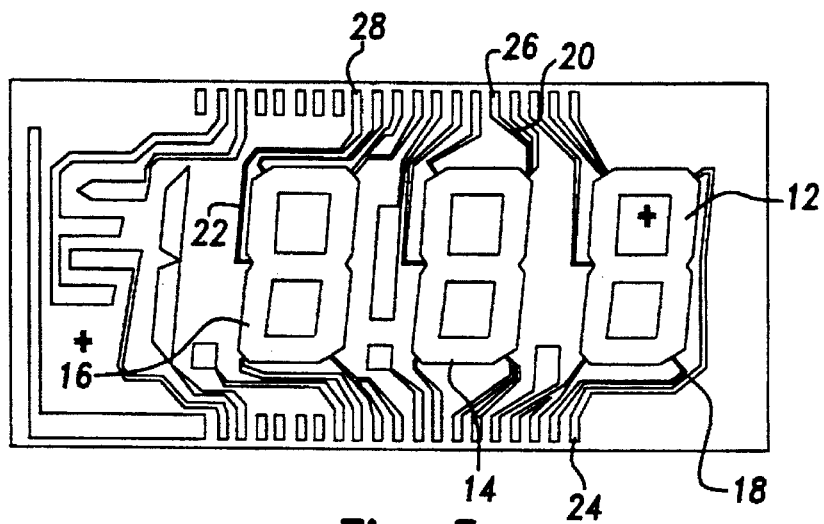
FIG. 3 is an illustration of a substrate including the active electrodes of a segmented display device in accordance with the prior art.
Figure 4:
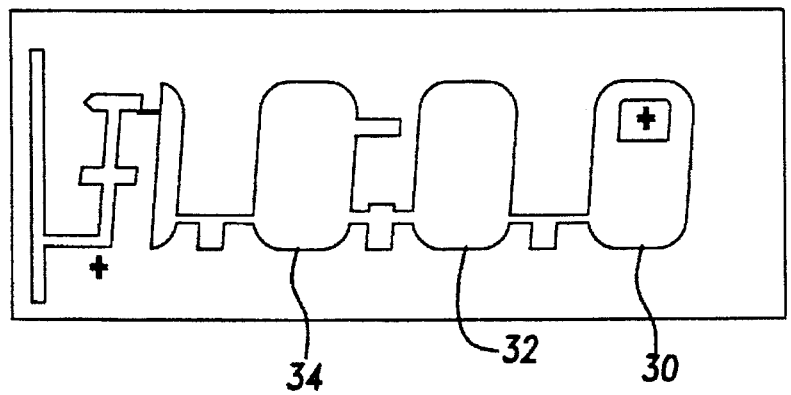
FIG. 4 is an illustration of a substrate including the common electrodes of a segmented display device in accordance with the prior art.

While the specification concludes with claims defining the features of the invention that are regarded as novel, it is believed that the invention will be better understood from a consideration of the following description in conjunction with the drawing figures, in which like reference numerals are carried forward.

Figure 5:
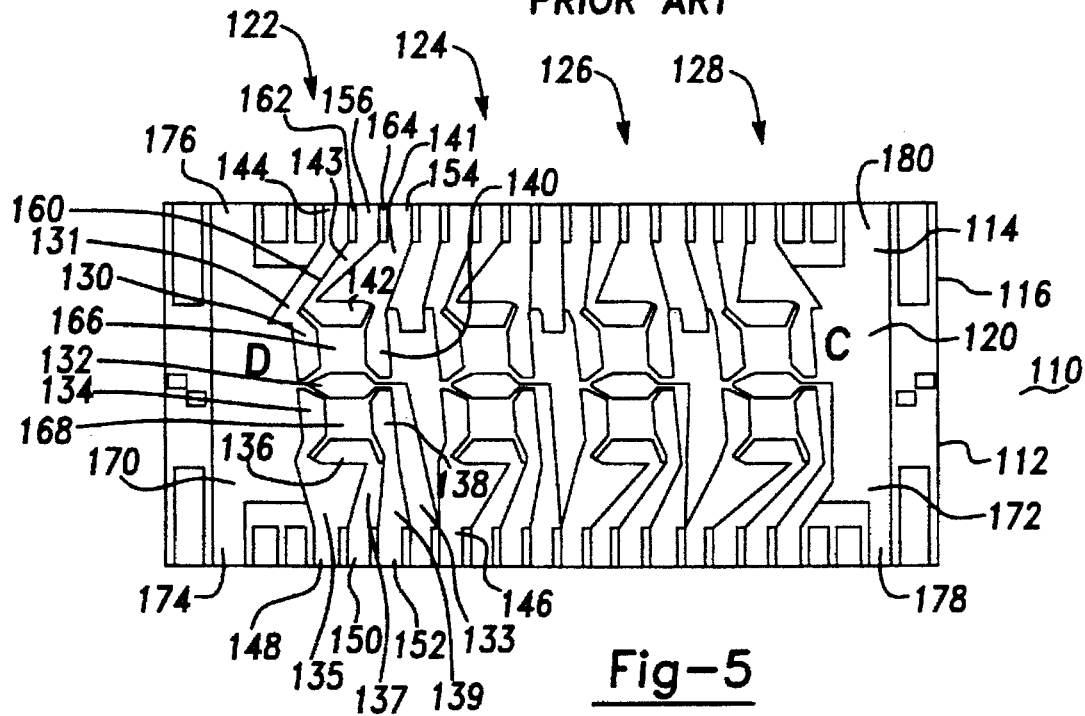
FIG. 5 is a top plan view of a substrate including the active electrodes of a segmented display device in accordance with the instant invention.
Figure 6:
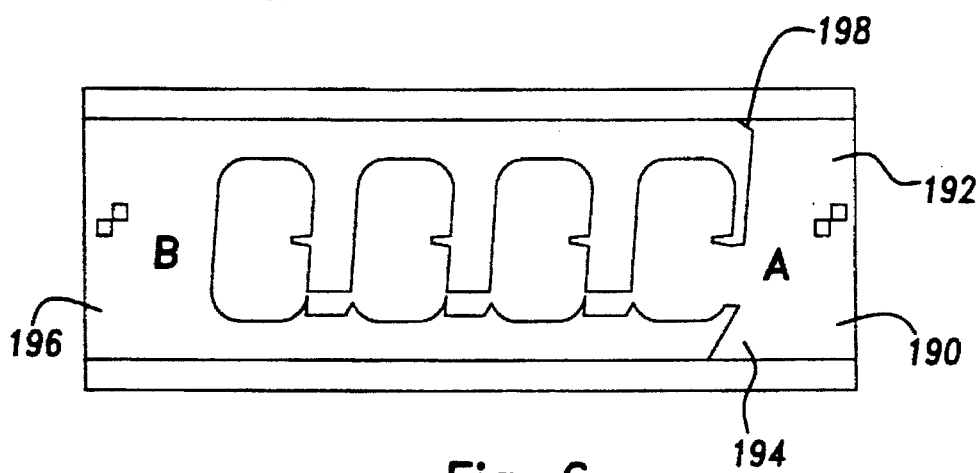
FIG. 6 is a top plan view of a substrate including the common electrodes of a segmented display device in accordance with the instant invention.

Referring now to FIG. 5 there is illustrated therein a top plan view of a substrate including the active electrodes of a segmented display device in accordance with the instant invention. For purposes of clarity, all areas in FIGS. 5 and 6 are covered with a thin layer of a conductive material, hence only those areas appearing shaded are uncoated with such material. The segmented display device 110 includes a first display substrate 112 fabricated of an insulating material such as glass, plastic, ceramic, or some other polymeric material, and combinations thereof. The substrate 112 has first and second major surfaces 114 and 116.

The device 110 may further include an electrode layer 120. The electrode layer 120 should be a transparent electrode material so that light incident on the display will pass through the electrode layer 120 and reflect off a color imparting layer. Accordingly, the electrode layer 120 is typically a thin layer of metal such a silver, copper, titanium, molybdenum, and combinations thereof. Alternatively, the electrode layer maybe a thin layer of a transparent conductive material such as indium tin oxide.

The layer 120 is sub-divided into a plurality of areas by providing very narrow gaps in the electrode layer. The gaps are formed by conventional photolithographic processes. Accordingly, the dark areas represent areas where electrode materials is not present, and hence the gaps define areas of conductive material. The areas of conductive materials defined by the gaps represent the segments of the display device 110. Accordingly, the instant invention relies on depositing an entire layer of electrode material, and forming thin non-conducting regions to define the segments. Conversely, the prior art device relied on forming conductive elements only in the region where the segment is desired.

In FIG. 5, the active plate on substrate 112 includes sufficient segments to provide, for example, four digits 122, 124, 126, 128. It is to be understood that while four digits are illustrated, the display may be fabricated with any number of digits. Referring now specifically to digit 122 as illustrative of all digits on the display, there is provided a seven segment digit. Digit 122 comprises segments 130, 132, 134, 136, 138, 140, 142. Associated with each segment is a corresponding connecting region 131, 133, 135, 137, 139, 141, 143. The segments communicate with conventional driving circuitry via contact pads 144, 146, 148, 150, 152, 154, 156 respectively. Specifically, a driving circuit applies a driving voltage to, for example, segment 140 via contact pad 154. In this way, the entire area connected to contact pad 154, including segment 140, as well as connecting region 141, will be addressed by the driving voltage. Connecting region 141 and segment 140 are isolated from adjacent segments by the gap defined by line 160, which terminates in gaps 162 and 164 on either side of contact pad 156. Gaps 162 and 164, as well as line 160 all represent areas in which the conductive material has been removed from the surface 114 of substrate 112.

Two central regions 166, 168 are bounded by the segments of digit 122. These central regions are electrically common with the central regions of all of the digits on the substrate, as well as all non-segment areas, such as peripheral regions 170, 172. The peripheral regions 170, 172 may be addressed by contact pads 174, 176, 178, 180. Addressing of the segments, as well as the central regions is described in greater detail hereinbelow.

Referring now to FIG. 6 there is illustrated therein a top plan view of a substrate including the common electrodes of a segmented display device in accordance with the instant invention. The common electrode substrate 190 is disposed opposite the first substrate 112, and is fabricated of a high quality, transparent material such as that described above with respect to substrate 112. Disposed on one surface of substrate 190 is a transparent layer of conductive material 192, fabricated of materials such as those described hereinabove with respect to layer 120.

The layer of conductive material 192 is divided into two regions 194 and 196 separated by a thin, substantially continuous gap in the conductive material 198. This gap is formed by conventional photolithographic techniques, as is well known in the art. The first region 194 defines a common electrode for each of the segments on the first substrate 112. The first region 194 is a continuous common region for all of the segments on the first substrate. This provides substantial advantages in addressing the display, as will be detailed hereinbelow. The second region 196 corresponds to the areas on the first substrate which would be the background of the display. Further, the second region 196 corresponds also to the connecting regions 131, 133, 135, 137, 139, 141, 143. That is the second region 96 includes those areas not corresponding to the segments.

Both substrate 112 and substrate 190 may further have a layer of insulating material and/or a layer of alignment material disposed thereon (not shown). The purpose of these layers is to enhance the performance of the liquid crystal materials disposed therebetween, as described in greater detail hereinbelow.

The substrates 112 and 190 are arranged in opposed, facing relationship so that said layers of conductive material are parallel and facing one another. Disposed between said layers of conductive material is a layer of a liquid crystal material having periodic modulated optical structure that reflects light, example of which include PSCT or PFCT liquid crystal material. The liquid crystal material comprises a nematic liquid crystal having positive dielectric anisotropy and chiral dopants. The material may or may not contain polymer gel or dye. The pitch of the cholesteric liquid crystal is in a range of between 0.25 to about 1.5 microns. Thus, an electrical field may be applied to a layer of PSCT or PFCT liquid crystal material disposed therebetween. Once such a field is applied, the material is set to one of two said stable states, where it will remain until a new field is applied.

With respect to driving the display, and referring back to FIGS. 1, 5, and 6, there is illustrated a typical electro-optical response curve for a PSCT or PFCT display, in which $V_1$, $V_2$, $V_3$, and $V_4$ are as defined above. $V_5$ and $V_6$ are defined as follows:

$V_5 \approx (V_4+V_3)/2$ and is in the range of 30 to 40 volts;

$V_1 \geq V_6 \geq (V_4-V_3)/2$ and $V_6$ is approximately 5 volts.

Accordingly, one may now apply addressing voltages to the different groups of areas as follows:

Segments 130, 132, 134, 136, 138, 140, 142 on substrate 112=$-V_6$ or $+V_6$;

All other regions on substrate 112=$-V_6$ or $+V_6$;

Region 194 of substrate 190=0 V or $V_5$; and

Region 196 of substrate 190=$V_5$ or 0 V.

In this example, + refers to a voltage being applied out of phase with that on the electrode on the opposite substrate, while − refers to a voltage being applied in phase with that on the electrode on the opposite substrate.

Using the values described above, addressing the display to illuminate the numeral "8" on digit 122 may be accomplished as follows:

Step 1—erasure of any pre-existing image on the digit

The erasure of a pre-existing image is accomplished by applying a voltage of $+V_5$ to regions 194 and 196, while the segments and other regions on substrate 112 are addressed with a voltage of $-V_6$. In this way the entire display appears black.

Step 2—writing onto a digit

To write a digit, apply a voltage of $V_5$ to region 194, and a 0 voltage to region 196. Simultaneously, a voltage of $+V_6$ is applied to selected segments, and a voltage of $-V_6$ is applied to non-selected segments. In order to display the number "8" all segments are selected. Conversely, to display the number "6", only segments 130, 132, 134, 136, 138 and 142 are selected. Each of the numbers "0" through "9" may thus be illuminated using various combinations of the segments.

Step 3—Termination of driving voltages

Having thus addressed the digit, all driving voltages are withdrawn and a voltage of 0 is applied. As the PSCT and PFCT materials are stable, they will remain in the state to which they are set. Thus, all selected segments are in the reflecting mode (appearing as yellow in this example), while the background and non-selected segments will be black.

Conversely, to write a black (non-reflective) on yellow (reflective) image, which is preferred for aesthetic reasons, the required steps are as follows:

Step 1—erasure of any pre-existing image on the digit

The erasure of a pre-existing image is accomplished by applying a voltage of $+V_5$ to regions 194 and 196, while the segments and other regions on substrate 112 are addressed with a voltage of $+V_6$. In this way the entire display appears yellow.

Step 2 —writing onto a digit

To write a digit, apply a voltage of $V_5$ to region 194, and a 0 voltage to region 96. Simultaneously, a voltage of $-V_6$ is applied to selected segments, and a voltage of $+V_6$ is applied to non-selected segments. Once again, in order to display the number "8" all segments are selected. Conversely, to display the number "6", only segments 130, 132, 134, 136, 138, 142 are selected. Each of the numbers "0" through "9" may thus be illuminated using various combinations of the segments.

Step 3—Termination of driving voltages

Having thus addressed the digit, all diving voltages are withdrawn and a voltage of 0 is applied. As the PSCT and PFCT materials are stable, they will remain in the state to which they are set. Thus, all selected segments are in the non-reflecting mode (black), while the background and non-selected segments will be reflecting (yellow).

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A segmented liquid crystal display for a periodic modulated optical structure liquid crystal material, said display comprising:

a first display substrate having a layer of patterned conductive material disposed thereon, said patterned conductive material forming a plurality of display segments, and connecting regions in an active zone of said substrate, a plurality of peripheral regions in a background zone of said substrate, and a plurality of contact pads; wherein said display segments comprise at least part of an image to be presented on said display, and wherein said contact pads provide for electrical communication with display driving circuitry;

a second display substrate having a conductive material disposed thereon, said conductive material forming a conductive display region, and a conductive background region wherein said conductive display region and said conductive background region are electrically isolated by a thin and continuous region forming a gap; and a layer of periodic modulated optical structure liquid crystal material disposed between said first and second substrates.

2. A display as in claim 1, wherein said conductive display region on said second substrate forms a pattern corresponding to said display segments on said first substrate.

3. A display as in claim 1, wherein said contact pads effect electrical communication between electronic driving circuitry and said active region and said conductive background region on said second substrate.

4. A display as in claim 1, wherein said contact pads effect electrical communication between electronic driving circuitry and said display segments.

5. A display as in claim 4, wherein said contact pads are connected to said segments via said connecting regions.

6. A display as in claim 1, wherein said patterned conductive material on said first display substrate and said conductive material on said second display substrate is a transparent conductive material.

7. A display as in claim 6, wherein said transparent conductive material is indium tin oxide.

8. A display as in claim 6, wherein said patterned layers of conductive material are provided by selectively removing preselected areas of said conductive material.

9. A display as in claim 1, wherein said liquid crystal material is a cholesteric texture liquid crystal material.

10. A display as in claim 1, wherein said liquid crystal material is a cholesteric texture liquid crystal material selected from the group consisting of polymer free and polymer stabilized cholesteric texture liquid crystal materials.

11. A display as in claim 1, wherein said segmented display is adapted to display at least one digit.

12. A display as in claim 11, wherein each said digit comprises seven display segments.

13. A display as in claim 1, wherein said display substrates are fabricated of a material selected from the group consisting of glass, plastic, quartz, polymeric materials, and combinations thereof.

14. A segmented liquid crystal display for a periodic modulated optical structure liquid crystal material, said display comprising:

a first display substrate having a layer of patterned conductive material disposed thereon, said patterned conductive material defining a plurality of display segments and connecting regions in an active zone of said substrate wherein each display segment and connecting region is electrically isolated from its adjacent display segments and connecting regions by a thin and continuous region forming a gap, a plurality of peripheral regions in a background zone of said substrate, and a plurality of contact pads, wherein said display segments comprise at least part of an image to be presented on said display, and wherein said contact pads provide for electrical communication with display driving circuitry;

a second display substrate having a conductive material disposed thereon, said conductive material defining a conductive display region, and a conductive background region wherein said conductive display region and said conductive background region are electrically isolated by a thin and continuous region forming a gap; and a layer of periodic modulated optical structure liquid crystal material disposed between said first and second substrates.

15. A display as in claim 14, wherein said conductive display region on said second substrate forms a pattern corresponding to said display segments on said first substrate.

16. A display as in claim 14, wherein said contact pads effect electrical communication between electronic driving circuitry and said active region and said conductive background region on said second substrate.

17. A display as in claim 14, wherein said contact pads effect electrical communication between electronic driving circuitry and said display segments.

18. A display as in claim 17, wherein said contact pads are connected to said segments via said connecting regions.

19. A display as in claim 14, wherein said patterned conductive material on said first display substrate and said conductive material on said second display substrate is a transparent conductive material.

20. A display as in claim 19, wherein said transparent conductive material is indium tin oxide.

21. A display as in claim 19, wherein said patterned layers of conductive material are provided by selectively removing preselected areas of said conductive material.

22. A display as in claim 14, wherein said liquid crystal material is a cholesteric texture liquid crystal material.

23. A display as in claim 14, wherein said liquid crystal material is a cholesteric texture liquid crystal material selected from the group consisting of polymer free and polymer stabilized cholesteric texture liquid crystal materials.

24. A display as in claim 14, wherein said segmented display is adapted to display at least one digit.

25. A display as in claim 24, wherein each said digit comprises seven display segments.

26. A display as in claim 14, wherein said display substrates are fabricated of a material selected from the group consisting of glass, plastic, quartz, polymeric materials, and combinations thereof.

* * * * *

UNITED STATES PATENT AND TRADEMARK OFFICE
CERTIFICATE OF CORRECTION

PATENT NO. : 5,636,044
DATED : June 3, 1997
INVENTOR(S) : Haiji Yuan, et al.

It is certified that error appears in the above-indentified patent and that said Letters Patent is hereby corrected as shown below:

Column 2, Line 21, "or -). The" should be --or -), the--.

Column 2, Line 23, delete "and".

Column 2, Line 51, "a" should be --as--.

Column 4, Line 31, "maybe" should be --may be--.

Column 4, Line 37, "is" should be --are--.

Column 5, Line 32, "is" should be --is,--.

Column 6, Line 12, "1 - erasure" should be --1 - Erasure--.

Column 6, Line 18, "2 - writing" should be --2 - Writing--.

Column 6, Line 38, "1 - erasure" should be --1 - Erasure--.

Column 6, Line 44, "2 - writing" should be --2 - Writing--.

UNITED STATES PATENT AND TRADEMARK OFFICE
CERTIFICATE OF CORRECTION

PATENT NO.    : 5,636,044
DATED         : June 3, 1997
INVENTOR(S)   : Haiji Yuan, et al It is certified that error appears in the above-identified patent and that said Letters Patent is hereby corrected as shown below:

Column 6, Line 55, "diving" should be --driving--.

Column 6, Line 62, "dear" should be --clear--.

Signed and Sealed this

Ninth Day of December, 1997

*Attest:*

BRUCE LEHMAN

*Attesting Officer*     *Commissioner of Patents and Trademarks*